United States Patent [19]
Browning, Jr.

[11] 3,965,753
[45] June 29, 1976

[54] ELECTROSTATIC ACCELEROMETER AND/OR GYROSCOPE RADIOISOTOPE FIELD SUPPORT DEVICE

[76] Inventor: Alva LaRoy Browning, Jr., P.O. Box 4023, Santa Barbara, Calif. 93103

[22] Filed: Oct. 9, 1973

[21] Appl. No.: 404,294

Related U.S. Application Data

[63] Continuation-in-part of Ser. No. 41,845, June 1, 1970, abandoned.

[52] U.S. Cl. ............................... 73/504; 73/517 B
[51] Int. Cl.² .................... G01C 19/24; G01P 15/08
[58] Field of Search ........... 73/382, 516 R, 516 LM, 73/517 R, 517 B

[56] References Cited
UNITED STATES PATENTS

| | | | |
|---|---|---|---|
| 3,011,347 | 12/1961 | Boitnott | 73/517 R X |
| 3,065,640 | 11/1962 | Langmuir et al. | 73/517 B |
| 3,148,456 | 9/1964 | Browning | 73/517 R X |
| 3,206,987 | 9/1965 | Cunningham | 73/517 R |
| 3,370,472 | 2/1968 | Cunningham | 73/517 B |

OTHER PUBLICATIONS

Physics, by Hausmann & Slack, 2nd Edition, Sept. 1935, Braunworth & Co., Inc., pp. 453–455.

*Primary Examiner*—James J. Gilu

[57] ABSTRACT

An electrode assembly formed by three pairs of electrodes creates a three axis electrical field which surrounds a charged particle confined in a sealed space consisting either of a vacuum or one filled with a selected gas. The field is energizable whereby to support the particle centerably in a state of stable equilibrium. A detector mounted exteriorly with respect to the electrode assembly is responsive to displacement of the particle from the central position, as the result, for example, of acceleration due to gravity or other motion, and a restoring force in operable association with the detectors and the electrical field is triggered by the displacement to return the particle to the central position.

9 Claims, 5 Drawing Figures

U.S. Patent June 29, 1976 3,965,753
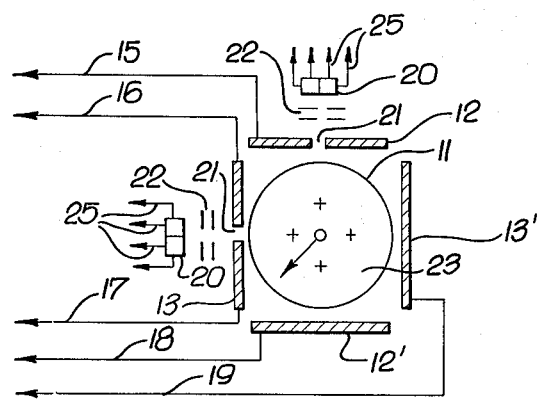
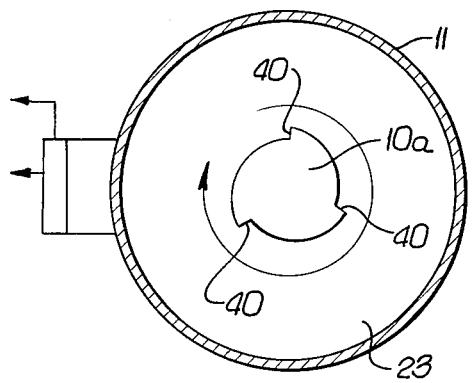
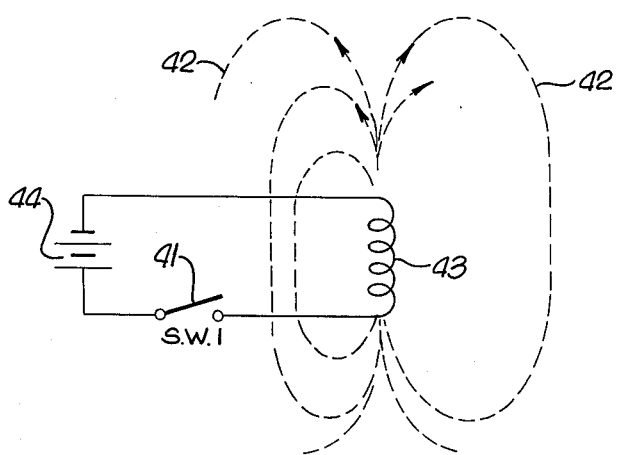
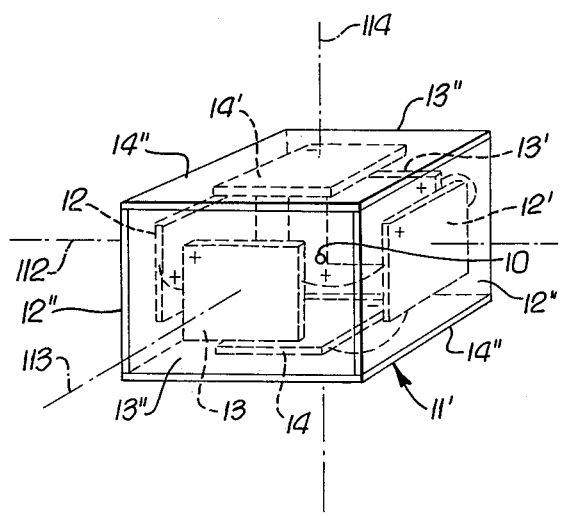
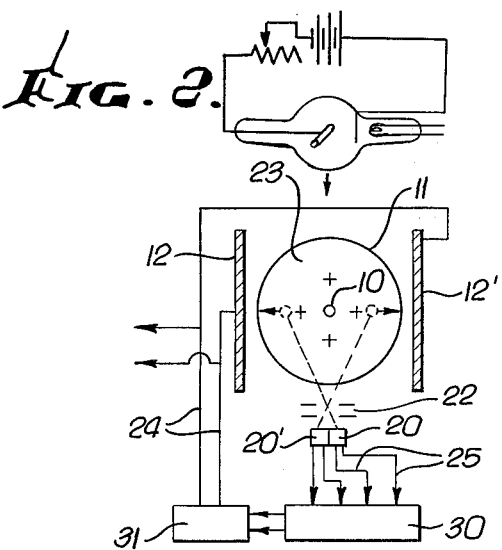

ELECTROSTATIC ACCELEROMETER AND/OR GYROSCOPE RADIOISOTOPE FIELD SUPPORT DEVICE

This is a continuation-in-part of copending application Ser. No. 41845 filed June 1, 1970 now abandoned.

This invention relates to a sensing device and more particularly to a device for measuring accelerations and angular displacements relative to inertial space.

The present application covers improvements over my basic U.S. Pat. No. 3,148,456, filed Dec. 8, 1960, and granted Sept. 15, 1964.

It has long been desired to eliminate the major sources of error from various types of mechanical and electromechanical sensing devices, such as accelerometers, gyroscopes, gravimeters, magnetometers, seismographs, etc. The main contributing factor in the production of such errors is friction in its various and numerous manifestations. The necessity of using mechanical methods of restraint and support for the proof masses and gyroroters combined with the resulting mechanical friction produces not only first order effects such as excessive drift, and bearing friction and gimble bearing friction produced precession, as in the case of a gyroscope, but a host of undesirable secondary effects due mostly to the restraint requirements such as tumbling, gimble lock, coning errors, etc. In summation, almost all such devices in use today suffer from a number of these rather basic defects.

The embodiment of the invention as disclosed in U.S. Pat. No. 3,148,456 allows the support in stable equilibrium of a sensing mass and/or gyroscope rotor, usually with three degrees-of-freedom relative to an outer casing. This is accomplished in some instances and for certain applications without the use of externally applied support voltages, and in this particular configuration, being essentially an open-looped, non-serveod or "passive" instrument as it shall here and after be referred to. For some applications, particularly terrestrial and high G applications, I have found it to be desirable to apply external voltages to support the radioactively charged sensing mass. These voltages or potentials are applied to the electrically charged sensing mass along one, two or three coordinate axes, the voltages usually being applied to diametrically opposed electrodes or plates, either one, two or three pairs.

The magnitude of these voltages is regulated by the readout mechanism, either charged particle sensing, optical, electrometer, etc., so as to maintain the radioactively charged sensing mass in a null position by virtue of the electrical forces of repulsion or attraction. The magnitude of the applied voltage requirements necessary to maintain the sensing mass in the null position is then indicative of the acceleration or inertial forces acting upon the sensing mass.

The embodiment of the invention in this application, is essentially a closed-loop or force-balance type of instrument. I prefer to refer to it as the ACTIVE RIFS (radio-isotope field support), and shall do so throughout the remainder of this application.

The basic invention utilizes the emission of electrically charged particles originating either from radioisotopes or produced by an equivalent secondary effect such as irradiating a gold-plated sensing mass with x-rays and resulting in secondary beta or electron emission to electrically charge the sensing or proof mass and to maintain the critical charge-to-mass ratio of the sensing mass. Maintaining the charge-to-mass ratio at something near a practical constant value necessitates that a condition of electrical equilibrium be developed and maintained within the instrument.

The basic invention, in one configuration, also utilizes the emission of said positive and/or negative electrical charges from the sensing mass, usually alphas and/or betas, to develop and maintain the support, in stable equilibrium, of the sensing mass, relative usually to a larger outer casing and with one, two or more generally three degrees-of-freedom. This is accomplished by virtue of the electrical fields or gradients produced when the sensing mass is displaced relative to the outer housing or casing. The magnitude of the aforementioned fields or gradients is dependent upon and a function of the displacement of the sensing mass from a central null or zero force position. This is made possible by the fact that the source of the fields or gradients, at any one instant of time, i.e. the electrical charge distribution, is in most embodiments the sensing mass or its equivalent, and as before stated, the magnitude and direction of the electrical forces developed is a function of the displacement in magnitude and direction of the sensing mass relative to the outer casing, as the said mass is the equivalent of a point source of electrical charge being constantly emitted.

Therefore, for any displacing force acting upon the sensing mass, there is developed an equal and opposite restoring force resulting in the development of a stable equilibrium condition where restoring forces are developed automatically and exactly balance inertial inputs, the degree of said displacement being indicative of the magnitude of the inertial input. This occurs in theory and has been reduced to practice for a number of applications, including accelerometers, seismographs and gyroscopes.

Earnshaw's theorem is not applicable to a special case of this type but remains universally applicable to the general cases and especially the classical static electrostatic example.

In the basic invention, as covered by the above mentioned patent, it is possible to use various combinations of radioisotopes generally located upon or being a part of the sensing mass, and attain support of the sensing mass and also rotation, if desired, for the gyro application. In practice, however, the combinations resulting in the most satisfactory performance seem to be the positive and negative charge emission combination sometimes referred to as "double-labeled" sources, and generally emitting electrons and alpha particles. The other most satisfactory type of radioactive sensing mass is the single particle emitter or "single-labeled" source. This is most generally a beta emitting isotope such as Strontium 89 or 90, if it is desired to establish and maintain a positive electrical charge upon the sensing mass. In the case of the single-labeled source, the beta or electron emitter can perform all the functions of the more complex double-labeled source or sensing mass, those of charging the sensing mass, production of restoring forces, supplying a constant angular force to the rotor in a gyroscope configuration, and acting as the equivalent of a point source of beta particles being attenuated, in some configurations, by a gaseous medium, (between the sensing mass and outer casing) and being the basis of one type of readout mechanism.

The mechanism whereby a single-labeled source or a sensing mass can produce restoring forces is not as simple and straight-forward as the double-labeled case;

however, the basic mechanism involved is, upon close examination, just exactly similar in both cases.

In the single-labeled case, the continued emission of betas or electrons from the sensing mass results in the said mass becoming electrically charged to a comparatively high positive potential above ground. (See FIG. 1 of drawing of U.S. Pat. No. 3,148,456). When the said positive potential is attained, electrical equilibrium conditions will be established for the device, and when said electrical equilibrium conditions are established, the same quantity of negative charge or electrons must return to the sensing mass through the surrounding gaseous media or leave it, by beta emission, per unit of time.

The mechanism whereby this is accomplished is that the exchange-of-charge mechanism results in the production of positive ions, in close proximity to the sensing mass by electron bombardment and ionization, and that a resulting linear acceleration of the said positive ions occurs from a point of higher positive potential above ground (the sensing mass) to a point of lower positive potential above ground (the inner wall of the outer casing). The overall result is that the sensing mass is the equivalent of a point source of positive charge being emitted equally in all directions and being intercepted by the wall of the outer casing. As in the case of the double-labeled sensing mass, this results in the development of electrical gradients and restoring forces as a function of inertial inputs or displacements of the sensing mass. The basic mechanism and the analytical treatment in the two cases are exactly similar relative to the dynamics of the instrument.

The features of the present invention which are believed to be novel and which are set forth in the appended claims, differ from the disclosure of U.S. Pat. No. 3,148,456 to the extent that externally applied electrical forces are utilized in combination with the radioactively developed restoring forces and charged sensing mass to allow the support of said mass in a condition of stable equilibrium.

Among the objects of this invention is to provide a new and improved inertial sensing instrument.

Another object of this invention is to provide in one configuration, an improved one, two, or three-degrees of freedom electrostatic accelerometer utilizing an external voltage source.

Still another object of this invention is to provide an improved dual or multipurpose instrument that combines both the aforementioned functions into a single instrument capable of measuring acceleration along the three coordinate axes simultaneously with the measurement of angular displacements relative to inertial space, this being accomplished by using in part an external power and/or voltage source.

A still further object of this invention is to provide a single combined or dual purpose instrument acting both as an "active" force-balance instrument utilizing an internal voltage source of supply restoring forces to the sensing mass, and also acting as a "passive" or open-loop instrument where the restoring forces are supplied by radioisotopes, said instrument requiring no modification for functioning, and having two or more separate scale factors.

Also included as an object of this invention is to provide an active and/or passive instrument where the sensing mass is made to oscillate with a linear trajectory or rotate with a prescribed orbit, and where said linear trajectory and/or orbit is used as a sensor of both accelerations and angular displacements relative to inertial space.

An additional object of this invention is to provide an improved configuration allowing the support in stable equilibrium of an electrically charged body in an electrostatic field with one, two or three-degrees of freedom, utilizing in part an external power and/or voltage source.

With the above cited objects in view, the invention consists of the construction, arrangement, and combination of the various parts of the device whereby the objects contemplated are attained as hereinafter set forth pointed out in the appended claims and illustrated in the accompanying drawings.

In the drawings:

FIG. 1 is a sectional view showing a two axis configuration of an electrostatic accelerometer and/or gyroscope utilizing, in part, externally applied electric fields to support the sensing mass in a condition of stable equilibrium.

FIG. 1A is a perspective schematic view of the device in a three axis configuration.

FIG. 2 is a simplification of FIG. 1, representing a single axis device and including some illustrative external circuitry.

FIG. 3 is a diagramtic view of a simple magnetic field coil circuit utilized for purposes of explanation in conjunction with FIGS. 1 and 2.

FIG. 4 is a schematic sectional view showing embodiment of the invention in a gyroroter.

In an embodiment of the invention chosen for the purpose of illustration there is shown in FIG. 1, a central sphere comprising a sensing mass which may be a charged particle. The sphere may be hollow, solid, or cellular and is enclosed by an outer stationery sphere or housing 11 of larger diameter. The sphere 10 may be any one of a number of different types of materials as for example dialetric, semi-conducting, or conducting, but is preferably of a material which is stable and does not outgas or change its physical properties. The sphere may be described as a charged particle or sensing mass. The electrical charge may also be generated on the mass by an external source such as an X-ray beam. Conducting and diametrically opposed sets of energizable plates 12, 12', and 13, 13' surround the sphere 10. Two axes of support are illustrated in right angular relationship and for a three axis support a third pair of plates may be placed on a vertical axis as viewed in FIG. 1. Electric leads 15, 16, 17, 18, and 19, and appropriate switch means (not shown) serve to energize the conducting plates. Detectors 20 may be single, dual or quadrant beta charged particle or radiation detectors, and can be of the solid state types, and are in line with an aperture 21 in the conducting plates 12, 12' and slit systems 22.

The central sphere 10 in FIG. 1, in one example, contains a radioisotope emitting either positive or negative charge particles and may be, for example, polonium 210 or strontium 89 or 90 in the form of hollow strontium silicate spheres of from 50 to 300 microns in diameter, such as those presently available from the Isotope Products Division of Oak Ridge National Laboratories, Oak Ridge, Tennessee. A space 23 within the sphere 11 is maintained at a near vacuum. For each beta that leaves the central sphere or sensing mass 10, there is developed one net unit of positive charge on the sensing mass. If, however, an alpha or positive charge emitter is utilized, the developed charge on the sensing mass is negative. A beta emitter is preferable in most configurations. The result is that an electrical charge is established and maintained on the sensing mass.

The primary purpose of the outer sphere 11 in this particular embodiment and as described in this application is to physically contain the sensing mass, and to maintain the partical vacuum within the space 23. Containment, however, may be accomplished in other ways. The material of sphere 11 may consist of various types of materials, but is best composed of material with a dialectric content close to unity in order to reduce the image effect and interference with the applied electrical fields.

The electrical potential developed on the sensing mass is dependent upon a number of factors, such as sensing mass radius, degree of vacuum, maximum energy of the emitted charge particles, etc. It is not necessary to maintain a constant charge and thus a constant charge-to-mass (c/m) ratio for the sensing mass in this embodiment. In the sectional view of FIG. 1 and most configurations, where the sensing mass has three degrees-of-freedom, it may be assumed that there is a third set of conducting plates, at right angles to plates 12, 12' and 13 and 13', and in the same approximate proximity to the outer sphere 11, and when three sets of plates are utilized to allow support with three degrees-of-freedom the detector 20 may be of a dual and quadrant type.

The purpose of the energizable conducting plate is to apply external electrical restoring forces along one, two or generally three coordinate axes, to return the sensing mass or charged particle, as the case may be, to its central or null position when the sensing mass is introduced into the containment area 23. When the sensing mass is located anywhere within the area 23 the servo controlled voltages applied to the electrodes 12, 12' and 13 and 13' center and hold the sensing mass until the electrodes are energized.

Apertures 21, FIG. 1, in the plates are arranged so as to be transparent to the betas, nuclear particles or light, depending upon the readout method used, such being emitted from the sensing mass, and allowing them to reach the sensors with little or no attenuation. The apertures are also arranged to produce little or no disturbance in the developed electrical restoring forces. Slit systems 22, are so arranged as to further narrow the width of the beta or positive charge beam emitted from the sensing mass before reaching the detectors.

To best understand the radioactive isotope field support, or RIFS concept, it is best to consider the simplest possible example, that of single degree-of-freedom or one axis operation, as illustrated functionally in FIG. 2. FIG. 2 is similar to FIG. 1, except that only one set of energizable conducting plates is involved and simplified external circuitry is indicated at 24 and 25. It is assumed that some other limiting or containment method is utilized in FIG. 2 in order that the motion of the sensing mass is restrained along two axes, that of a line to the left and right of the page and that axis represented by an imaginary line perpendicular to the first and into the page. The axis along which the sensing mass is free to move is horizontal or to the left and right relative to the page and is indicated in FIG. 2 by the arrows in the space 23 within outer sphere 11. All of the other factors and conditions are as described for FIG. 1.

When sensing mass 10, FIG. 2 is in the central or null position, shown by the solid line, charged particles or radiation, emitted from the sensing mass or reflected by the mass from an external source, as the case may be, penetrate through the slit system 22, and impinge upon detectors 20 and 20'. The slit systems 22 are so arranged that when the sensing mass 10 is centered and in its null position, the detectors 20 and 20' receive approximately the same number of particles emitted from radioactive source 10 per unit of time, resulting in no signal being transmitted to an amplifier 30. When an inertial input such as gravity or another acceleration displaces the sensing mass 10 in the horizontal direction, i.e. to the left of the paper, as indicated by the inner sphere in broken lines, the detector 20 receives most or all of the particles transmitted through slit system 22, while the detector 20 receives few or no particles. As a result of this displacement of the sphere, detector 20 transmits a signal to amplifier 30. This signal is further amplified in an amplifier 31 and results in the appropriate voltage being applied to plates 12, 12' to return the sensing mass to its null or central position. The amplifier 30 is preferably an A. C. amplifier and demodulator, and the amplifier 31 a D. C. amplifier and voltage source.

The same action occurs if the sensing mass 10 is displaced to the right of the page except that detector 20' receives most of the particles or radiation and transmits a signal to amplifier 30. The voltages, and polarity of same applied to the plates, by the amplifier and voltage source 31 is proportional in direction and magnitude to the inertial input or acceleration along the sensitive axis of the device.

The operation of a two or three axis device, FIG. 1, operates on the same basic principle except that an additional set of energizable conducting plates (not shown in the drawing) is added perpendicular to each sensitive axis, the maximum number of course being three sets in the case of a three-axis or three degree-of-freedom device. In the three-axis configuration, two sets of detectors are required, as shown in FIG. 1, and are generally of the dual and quadrant variety.

If desired, six separate particle or radiation detectors can be used in combination, which will effectively give position signal along all three coordinate axes. In this case a quadrant detector, or four separate detectors in a single unit, such as presently available beta sensitive diodes, senses acceleration along two axes, and a dual detector, or two separate detectors in a single unit, senses acceleration along the third axis. The output from these external detectors is amplified and made to regulate the applied voltage, in amplitude, phase and polarity applied to the three sets of external electrodes.

Various other types of readout may be used as disclosed in U.S. Pat. No. 3,148,456 such as optical, electrical, magnetic, etc., and the presently described concept is not limited to nuclear particle detection. In fact, with some applications, other methods of readout have proven to be entirely acceptable.

The configuration of FIG. 1 is very basic and is used to illustrate many of the various optional or combined suspension methods.

A further embodiment of the invention chosen for the purpose of illustration in a simpler and more practical form is shown in FIG. 1A. In this form the support is provided by an alternating suspension method where alternating voltages are applied to the electrodes or plates and provide support for the the electrically charged sensing mass 10.

For a three axis configuration as shown in FIG. 1A there is a housing 11' serving substantially the same purpose as the stationary sphere 11 of FIGS. 1 and 2, namely to contain the sensing mass 10 in a vacuum or gas. In this embodiment the housing 11' is made sufficiently large to house also horizontally aligned pairs of energizable plates 12, 12' and 13, 13' on horizontal axes 112 and 113 together with a pair of vertically aligned pairs of energizable plates 14, 14' on a vertical axis 114.

Although separate plates are shown in the interest of easy explanation it should be understood that the walls of the housing 11' can be made of energizable material in which event horizontally aligned walls 12" and 13" provide support along the horizontal axes 112 and 113. Vertically aligned walls 14" provide support on the vertical axis 114.

This embodiment of FIG. 1A utilizes electrodynamic containment of the sensing mass. Unlike the approach of Nordsieck U.S. Pat. No. 3,003,356 in the containment method here disclosed the sensing mass is permanently electrically charged by nuclear or other means where the Nordsick device utilizes inductive methods of charging and support. The alternating voltage support is open-looped or passive requiring no readout controlled voltages but requiring an external A.C. voltage for the support of the sensing mass.

In one configuration of FIG. 1A all four horizontally aligned electrodes or plates 12, 12' and 13 and 13' are connected together electrically and an alternating voltage is applied between these interconnected plates and the vertically aligned plates 14, 14' which themselves are interconnected electrically. When an alternating voltage is applied to the plates a restoring force is exerted on the electrically charged sensing mass 10 and is a function of the position of the said sensing mass 10 and its displacement from the center of the configuration. The sensing mass 10 is then contained within the approximate center of the cubic array comprising all six electrodes when other external forces are absent. In this embodiment external sensors, 20 and 20' as shown in FIGS. 1 and 2 are not required.

Alternating fields of 300 Hertz have been found to be most satisfactory. Electrode dimensions can be from 0.2 to several centimeters although not limited to these dimensions. For the gravity gradient embodiment the best possible vacuum is required. A radioactive sensing mass with low specific activity of 0.01 millicuries per milligram can be used, with the preferable choice being a beta emitting isotope such as SR 89 or 90. Diameters of the sensing mass can be from less than 100 microns to 350 microns but not limited to these diameters. The alternating field support has been determined to be the most practical to be used in the gradiometer embodiment. Because of its simplicity and lack of readout requirements this method can also be used to great advantage where two degrees-of-freedom or two axis restoring fields are required such as in the reset phase of the gravity gradiometer. Thus, alternating field suspension can be used to produce passive, non-servoed, three degrees-of-freedom support making it possible to trap and hold a charged sensing mass passively. The said sensing mass can also be released from containment by deenergizing the field or pulsing the appropriate electrode with a voltage pulse that is opposite in polarity to that of the sensing mass and ejecting the sensing mass from the containment array or assembly through a suitable opening or aperture provided in one of the plates.

The general principle of the invention may be made use of as a gyroscope as shown diagramatically in FIG. 4. As there shown a RIFS type gyrorotor 10a is substituted for the sensing mass 10 of FIG. 1. Provision is made to utilize the energy supplied by radioactive decay and directionally charged particle emission or absorptions from the rotor to produce a constant angular rotation of the electrically charged and supported sphere 10a, relative to the outer shpere 11, the object of this configuration being to utilize the gyroscopic properties of a rotating body to sense angular displacements of the outer sphere 11, relative to the axis of rotation, and thus inertial space.

The basic support forces for the rotor 10a are supplied in the same manner as previously described, and usually with three degrees-of-freedom or three axis configuration representing a force-balance system, and do not interfere with the operation of the device as a gyroscope. Rotational force is generated by reaction to emission of beta particles from the points 40. The only major difference is that an additional or combined readout method must be incorporated to measure angular displacements, which does not interfere with the readout mechanism utilized to servo and control the basic, usually three degree-of-freedom electrical support forces.

Erection of the spind axis of the gyroscope to any desired frame of reference may be accomplished as described in the U.S. Pat. No. 3,148,456 without interfering with the force-balance support mechanism as described in the present improvement patent application, that, being accomplished by locating field coils externally, as shown in FIG. 3.

When, for example, switch 41 of FIG. 3 is temporarily closed, a magnetic field illustrated by the flex lines 42 is produced in the field plates 13, 13' as shown in FIG. 1. The field interacts with the magnetic field of gyrorotor 10a of FIG. 4, resulting in the alignment of the spin axis of the rotor in a direction parallel to the magnetic lines of force produced by those field coils on the axis 43 which are actually vertical relative to the drawing and which are energized by a battery 44. The switch 41 of FIG. 3 is then opened and the rotor is then free to detect angular inputs to the device.

It should be mentioned that the magnetic field of the rotor 10a is produced by the rotation of an electrically charged body, the rotor 10a, and is weak but sufficient to allow erection. It may also be mentioned that the device when used in the gyro configuration should be shielded against the earth's magnetic field and other stray fields because of the rotor's magnetic field, unless a device is used as a north seeking gyroscope, magnetometer, or similar device. This is readily accomplished in practice by the use of a MU metal shield or other orthodox means.

In practice rotors of up to 1½mm in diameter have been used, like those supplied by the Isotopes Division of the 3-M Company. Such rotors or "microspheres" contain approximately 0.5 millicures of SR-90 (Strontium 90) and are vacuum plated with several microns of nickel in such a way that the surface is not only made conductive but contains a ridge and striations resulting in the type of directional current leakage required to supply the desired angular rotation of the rotor.

It has been found that an externally weak magnetic field is sufficient to achieve erection of the rotor's spin axis to any desired frame of reference. Readout of the gyroscope may be accomplished by any of the methods covered in the U.S. Pat. No. 3,148,456 namely optical, magnetic, nuclear, etc., but can also be accomplished by using an eccentric mass unbalanced method whereby the geometric center of the rotor is displaced slightly from the mass-center of the rotor. This is usually done by non-uniform plating.

The eccentric motion of the electrically charged rotor resulting from the mass unbalance generates electrical signals in the external plates like 12, 12', 13, 13', as revealed in the supporting electronics of FIG. 1. The readout signal is at the rotor frequency and its variation in phase and amplitude allows the determination of the spin axis of the rotor relative to sphere 11. This method is most satisfactory in practice as it requires no modification of the basic configuration as illustrated in FIG. 1 and the normal accelerations of the device will not interfere with the accuracy of the angular readout. The more advantageous embodiment for the application is the cubic array with three sets of plates allowing support of the gyrorotor with three degrees-of-freedom, the essence of which is shown in FIG. 1A.

The operation of the instrument as a combined three degrees-of-freedom accelerometer and a gyroscope is readily visualized as a combination of the two before-described instruments, viz.—the ACTIVE RIFS three degree-of-freedom accelerometer and the gyro, whereby, the same sensing mass 10 or 10a as the case may be, FIGS. 1 and 4, acts both as a proof mass, sensing accelerations along the three coordinate axes in the above described force-balance device, and a three degree-of-freedom gyroscope using a separate or compatible angular readout mechanism.

The sensing mass 10, outer enclosure 11, electrical plates 12, 12' and 13, 13' and in most cases external electronics, is common to both functions. As can be realized by one knowledgeable in the state of the art, this device or multisensor represents a decided improvement over existing conventional devices and is capable of sensing accelerations along any three coordinate axes simultaneously with the detection of angular displacement of a vehicle airframe in roll and pitch or yaw.

Governing of the angular velocity of rotation of the rotor is accomplished as described for the PASSIVE RIFS, with the additional method made available by the electrical interaction of electrical signals applied to the support plates 12, 12' and 13, 13', etc., interacting with the eccentrically spinning rotor, if such type of readout is utilized.

For some applications it is desirable to have the characteristics of both the ACTIVE and PASSIVE RIFS combined in a single multi-purpose instrument. For example, in the accelerometer application the inventions can function as both the PASSIVE RIFS accelerometer as originally disclosed and as a force-balance type accelerometer as herein disclosed. The advantages of such an instrument extends the useful range of the accelerations that can accurately be measured with the same instrument.

In certain missile applications, it is desirable to measure the high G accelerations experienced in the launch or powered stage and also to measure very slight accelerations after termination of the major thrust or powered phase. This is made possible without physical modification of the accelerometer as shown in FIG. 1. For the high G phase of the flight, all factors as above described for the force-balance ACTIVE RIFS accelerometer are operative, resulting in very linear response and capability to withstand very high G accelerations and vibrations. With the termination of the major powered phase of the flight, the external electronics servoing the proof mass 10 is switched off so that no voltages are applied to the servoing plates or electrodes 12, 12' and 13, 13', etc.

In practice, all plates should be interconnected or shorted together at this time to eliminate stray electrical fields and image effects from affecting the proof mass. With external servoed voltages no longer acting upon the proof mass 10, it automatically assumes the characteristics of a PASSIVE RIFS device, being essentially a much more sensitive accelerometer with an entirely different scale factor and type of response, than when in the active or servoed mode. The sensitivity, scale factor, natural frequency and threshold is then entirely dependent upon the internal operational physical factors common to the particular instrument.

It has been analytically determined that in its active mode an instrument like that just made reference to could withstand and measure in excess of 1,000 G's and when switched to its passive mode would have a low G detectable threshold as little as $10^{-9}$ G's. No difficulty should be experienced in switching from one mode or scale factor to the other as many times as necessary except that some finite time is required for damping and stabilization when switching from the ACTIVE to the PASSIVE mode and vice versa. Damage could possibly occur if the instrument should be inadvertently switched to the passive or low G mode while in a high G environment. No physical modification or readout detectors and position of same is required. In most configurations the same detectors can be used for both modes, all necessary adjustments being accomplished in the external electronics.

It should also be apparent to one versed in the state of the art that various other combinations of ACTIVE and PASSIVE RIFS modes and applications are possible in a single instrument, depending upon the particular need and requirement, including the combination of high G ACTIVE and low G PASSIVE RIFS accelerometer modes with the gyro function. Combination of north seeking gyro and magnetometer and low threshold PASSIVE terrestrial RIFS gravimeter functions for under water submarine detection.

By way of explanation of adaptability of the invention, FIGS. 1 and 2 illustrate the RIFS in LTR (linear trejectory reference). In this particular embodiment the sensing mass 10 is supported with three degrees-of-freedom relative to the sphere 11, either using the PASSIVE RIGS technique or the ACTIVE force-balance technique as above described. An A.C. signal or voltage is then applied along one axis or between two of the electrodes 12, 12', as shown in FIG. 2, and being applied and superimposed over the basic D.C. support voltages, if such are utilized. The sensing mass 10 is then made to oscillate at the applied frequency and with an amplitude dependent upon the A.C. voltage applied.

The linear trejectory of oscillation of the particle horizontal to the page as shown in FIG. 2 can then be used as an angular inertial reference much as the spin axis of a gyrorotor is used. In this configuration the device represents a two-axis angular sensor when changes in the trajectory of the sensing mass relative to the external apparatus is detected.

Rotation can be detected about any axis except the one parallel to the direction of steady state oscillation. The PASSIVE LTR, only a single set of external electrodes is utilized as illustrated in FIG. 2 to accomplish initial erection of the particles' relative trajectory, and when the sensing mass is allowed to oscillate in essentially an undamp state, the period being determined by various factors, including the specific activity of the sensing mass, type of gas and pressure, physical dimensions of spheres 10 and 11, FIG. 2 and the ratio of their diameters, etc.

The PASSIVE LTR is best used in low G applications such as space or fixed terrestrial applications where other accelerations and vibration error sources are kept at a minimum. In the PASSIVE RIFS in LTR, the single set of external electrodes 12, 12', FIG. 2, is only used for erection purposes by the application of the said A.C. signal or a short D.C. pulse to start the steady state oscillations, and then disconnected, until erection again becomes a necessity. In this particular embodiment the device is rather equivalent to a nuclear "motor" as all the energy utilized to sustain the oscillation except for readout and the initial electrical displacing force is nuclear.

Readout can be accomplished in a variety of ways. The method utilized should be such as not to be in itself a source of error. In the ACTIVE LTR, the linear momentum of the sensing mass produces a lag in the particles' trajectory relative to the A.C. electric lines of force being perpendicular to plates 12,12', FIG. 2, and when the device is rotated this is indicative of the rate of rotation of the device relative to inertial space.

In the PASSIVE LTR the displacement of the particles' linear trajectory from the erection axes or direction is an absolute measurement of angular displacement along two axes, in this particular embodiment being equivalent to a two axis free gyroscope and in this particular embodiment the relative direction of oscillation of the particle relative to the casing or outer sphere 11 is completely unrestrained after initial erection is accomplished.

It will be apparent that many combinations of the above described devices and those covered in the basic patent are possible. For example, it has never before been possible to detect or determine variations in roll, pitch and yaw at a single point or position within a vehicle air frame with a single inertial instrument. By combining the above described ACTIVE or PASSIVE LTR with the RIFS type gyroroter, as shown in FIG. 4, and including the readout, this is possible.

When referring to FIG. 2, the proof mass 10 is caused to oscillate with a linear trajectory across the page in either ACTIVE or PASSIVE LTR configuration as above described. The field coils on the axis 43, FIG. 3, is then temporarily energized by batteries 44 producing a magnetic field with flux lines 42, which effectively erects the spin axis of the RIFS type gyrorotor vertically relative to the drawing and parallel to the axis of the coil.

The production of the external magnetic field may temporarily affect the trajectory of the uniformly oscillating particle 10, FIG. 2. When, however, the gyro erecting field, FIG. 3, is discontinued, the trajectory of the sensing mass and/or rotor is unaffected. If the device is located in the C.G. of a vehicle air frame, acting as a RIFS-LTR, it can detect angular deviations in roll and yaw. When acting as a RIFS type gyroscope, ACTIVE or PASSIVE, the device can measure angular displacements in roll and pitch. By utilizing such a combination of functions, the single multi-sensor can readout angular inputs in roll, pitch and yaw. This is only made possible by the fact that the spin axis of the sensing mass and the linear trajectory of the oscillating sensing mass are completely independent and not interdependent relative to inertial space in this particular embodiment.

It should further be apparent that various combinations of ACTIVE and PASSIVE RIFS devices can be utilized to sense accelerations along any three coordinate axes simultaneously with the detection in rate and magnitude of angular displacements in roll, pitch and yaw relative to inertial space.

A further embodiment of the ACTIVE RIFS suspension technique is represented by an AC suspension method when AC voltages are applied to electrodes or plates 12,12' and 13,13' etc., FIG. 1, and provide a three axis support, for the sensing mass 10. The use of a RIFS type sensing mass or gyrorotor or its equivalent, being electrically charged either positively or negatively is, of course, required as in all other embodiments described, to best maintain the crticial charge-to-mass ratio of the sensing mass.

This last described embodiment utilizes electrodynamic containment of the sensing mass and is somewhat related to the device covered in Arnold Nordsick's U.S. Pat. No. 3,003,356 granted in 1961, except that in the RIFS-AC containment method the sensing mass is permanently electrically charged where the Nordsick device utilizes inductive methods of charging and support and the applications and embodiments possible are rather severely limited because of the inherent limitations of such support methods.

The RIFS-AC instrument is an open-looped sensor somewhat similar to the PASSIVE RIFS, but requires an external source of AC voltages for basic support of the sensing mass.

Referring again to FIG. 1, in one configuration all four plates, 12, 12' and 13, 13' etc. being vertical to the drawing, are electrically connected together. The RIFS sensing mass 10 is contained in a gaseous media by outer housing or sphere 11. The RIFS sensing mass or rotor maintains a constant charge-to-mass ratio. When AC voltage is applied between the inter-connected vertical plates and also the interconnected horizontal end plates, which would be top and bottom plates in the drawing, a potential gradient or well is produced in the approximate center of the cubic array. The sensing mass 10 is then contained within the potential well or "sink" in a condition of stable equilibrium and in the center of the geometry, if all other external forces and inertial input are absent.

AC frequencies of about 300 Hertz are most satisfactory. Electrode dimensions can be from 0.2 to several centimeters although not limited to these dimensions. Gas pressures of from $10^{-7}$ millimeters of mercury to several atmospheres can be utilized, depending upon the application of the instrument. A RIFS sensing mass with a specific activity from 0.2 to 10 millicuries per milligram can be used, with the preferable choice being a beta emitting isotope such as SR 89 or 90. Diameters of the sources can range from less than 100 microns to several millimeters or more.

Various electrical configurations are possible, two electrodes representing the minimum requirement, the six-plate cubic arrangement appearing to be the most practical. Conventional gas damping is, of course, a built-in function. Electrical methods such as eddy current damping can also be utilized in certain embodiments. Readout may be accomplished by using beta attenuation and counting methods, or their equivalent, and most of the other described readout techniques.

The instrument is a passive and non-linear response instrument and as such has rather limited practical terrestrial applications. The above described method can be combined with other ACTIVE and PASSIVE RIFS modes, and in certain applications can be used to advantage, such as supplying initial support to a PASSIVE RIFS sensing mass or rotor, where the specific activity of the sensing mass is deliberately at a low level and where some difficulty may be experienced in getting flotation or support of the sensing mass by the usual means, due to the length of time required to charge the sensing mass and develop the restoring forces.

The ACTIVE RIFS in various embodiments is usually used in conjunction with the PASSIVE RIFS mechanism. For high G applications it has been found that rather high specific activities of radioactive soruces are required to develop the restoring forces and also that in certain applications a more linear response instrument was preferable. Externally servoed electrical field forces are employed to complement the basic radioactive means of generating and restoring forces, and as a result the best features of both mechanisms are combined.

The two types of restoring forces are completely additive and compatible and if the sphere 10 in FIGS. 1 and 2 has a high degree of sphericity, there are no discontinuities developed in the response on developed restoring forces along any axis attributable to the combination of the two types of restoring mechanisms. The RIFS charging mechanism whereby the constant and critical charge to mass ratio is maintained upon the sensing mass and/or gyrorotor and by which means angular rotation is sustained by the said rotor, is common and necessary to both active and passive mechanisms.

The RIFS method is a practical solution to the needs of the prior art in maintaining the critical charge to mass ratio for long periods of time depending upon the half-life of the radioisotope, no initial or external charging mechanism required, conventional gas damping, simplified beta counting readout along with other methods, and the capability of long instrument storage before use. No pre-functions operations are required and high vacuum systems and power supplies for same are eliminated. The various ACTIVE and PASSIVE RIFS modes and combinations thereof are extremely practical, compatible, and solve and eliminate many practical problems.

There has accordingly been provided not only a single instrument capable of being used as an accelerometer, gyroscope, magnetometer, gravimeter or gravity gradiometer, but by various combinations of PASSIVE and ACTIVE concepts and their various modes, including the RIFS-LTR (linear trajectory reference) and RIFS-AAC (A. C. Containment) with the development of a whole family of practical instruments is possible, combining the best features of the various embodiments to fit the particular and specific requirements.

There have further been provided several improved methods of supporting a RIFS type radioactive, electrically charged sensing mass or its equivalent in a condition of stable equilibrium utilizing externally applied electrical fields, either AC or DC, or various combinations thereof.

While particular embodiments of the present invention have been shown and described, it will be obvious to those skilled in the state of the art that changes and modifications may be made without departing from this invention in its broader aspects, and therefore the aim of the appended claims is to cover all such changes and modifications as fall within the true spirit and scope of this invention.

Having described the invention, what is claimed as new in support of Letters Patent is as follows:

1. A sensing instrument including: a housing forming a closed chamber, an electrically charged sensing mass in said chamber, said sensing mass having a mass in excess of that subject to Brownian movement, said mass having therein radioactive material of selected particle emitting capability with a constant charge-to-mass ratio, an electrode assembly providing a supporting means comprising a plurality of pairs of electrodes with electrodes of respective pairs mounted on diametrically opposite side of said chamber and having a D.C. electric circuit interconnecting each pair of electrodes whereby said mass is freely supported by externally applied electric forces in a condition of stable equilibrium; and a detector in electrical operating association with at least one pair of electrodes and responsive to displacement of said sensing mass, said detector being mounted exteriorly with respect to said chamber.

2. A sensing instrument according to claim 1 wherein said detector includes means adapted to apply electric restoring forces to said electrode assembly productive of a return of said mass to a null position and support said mass in a condition of stable equilibrium.

3. A physical configuration as set forth in claim 2, wherein said electrical restoring forces comprise A.C. voltages applied to the said electrode assembly whereby said restoring forces are supplied to the electrically charges mass and support the same in a condition of stable equilibrium: said mass having a plurality of substantially circumferentially facing particle emitting discharge stations whereby said electrically charged mass has a rotating motion and said detector is in operative engagement with said housing and responsive to the angular displacement of the axis of said mass.

4. A physical configuration as set forth in claim 2 wherein said electrical restoring forces comprise A.C. voltages applied to said electrode assembly whereby said restoring forces are supplied to the electrically charged mass and support the same in a condition of stable equilibrium.

5. A sensing instrument according to claim 1 wherein there are three pairs of electrodes in a cubic array.

6. A sensing instrument according to claim 1 wherein there is a detector in electric operating association with each pair of electrodes.

7. A sensing instrument according to claim 1 wherein there are three pairs of electrodes and a detector in electric operating association with each pair of electrodes.

8. A sensing instrument including: a housing forming a closed chamber, an electrically charged sensing mass in said chamber, said sensing mass having a mass in excess of of that subject to Brownian movement, said mass having therein radioactive material of selected particle emitting capability with a constant charge-to-mass ratio, an electrode assembly providing a supporting means comprising a plurality of pairs of electrodes with electrodes of respective pairs mounted on diametrically opposite sides of said chamber and having a D.C. electric circuit interconnecting each pair of electrodes whereby said mass is freely supported by externally applied electric forces in a condition of equilibrium; and a detector in electrical operating association with at least one pair of electrodes and responsive to displacement of said sensing mass, said detector being mounted exteriorly with respect to said chamber, said detector including means adapted to apply electric restoring forces to said electrode assembly productive of a return of said mass to a null position and support said mass in a condition of equilibrium, and a supply of A.C. electrical voltage applied to a single set of the said electrodes producing a linear oscillation of the said electrically charged mass, the relative direction and trajectory of the linear oscillation comprising an angular reference relative to inertial space.

9. A sensing instrument embodying the stable equilibrium suspension of an electrically charged mass, said instrument comprising a housing forming a closed chamber, an electrode array exterior with respect to the mass, said array comprising pairs of force exerting units located exteriorly of said mass and on diametrically opposite sides, said mass being a non-radioactive material and an external means productive of charged particles on said mass whereby there is created and exists a secondary charged particle condition on said mass and a sustained electrical charge on said mass, said external means comprising rays of the character of X-rays directed on said electrically charged mass productive of secondary electrode emission.

* * * * *